US009574072B2

(12) United States Patent
Yun et al.

(10) Patent No.: US 9,574,072 B2
(45) Date of Patent: Feb. 21, 2017

(54) ULTRA-LIGHT POLYURETHANE ARTIFICIAL LEATHER COMPOSITION

(71) Applicants: HYUNDAI MOTOR COMPANY, Seoul (KR); Kia Motors Corporation, Seoul (KR); Dongahchemical Co., Ltd., Yangsan-si, Gyeongsangnam-do (KR); Dae Won Chemical Co., Ltd., Osan-si, Gyeonggi-do (KR)

(72) Inventors: Mi Jung Yun, Yongin-si (KR); Gun Kang, Seoul (KR); Jeong Seok Oh, Yongin-si (KR); Kie Youn Jeong, Hwaseong-si (KR); Soon Joon Jung, Seoul (KR); Doo Soo Kim, Seoul (KR); Hyun Joo Seo, Seoul (KR); Jung Lee, Seongnam-si (KR); Young Kyu Rhim, Hwaseong-si (KR); Young Koo Lee, Ansan-si (KR); Ju Seob Kim, Gunpo-si (KR); Woo Seung Shin, Seoul (KR); Dae Kyung Kim, Gunpo-si (KR); Choon Gil Kwon, Yangsan-si (KR); Chan Hee Lee, Yangsan-si (KR)

(73) Assignees: Hyundai Motor Company, Seoul (KR); Kia Motors Corporation, Seoul (KR); Dae Won Chemical Co., Ltd., Yongin-si, Gyeongsangnam-do (KR); Dongahchemical Co., Ltd., Osan-si, Gyeonggi-do (KR)

( * ) Notice: Subject to any disclaimer, the term of this patent is extended or adjusted under 35 U.S.C. 154(b) by 63 days.

(21) Appl. No.: 14/569,404

(22) Filed: Dec. 12, 2014

(65) Prior Publication Data
US 2016/0002444 A1 Jan. 7, 2016

(30) Foreign Application Priority Data
Jul. 4, 2014 (KR) ........................ 10-2014-0083855

(51) Int. Cl.
C08K 7/22 (2006.01)
C08K 3/00 (2006.01)
C08K 5/00 (2006.01)
B29C 41/00 (2006.01)
B29C 41/22 (2006.01)
B29C 41/46 (2006.01)
C08J 9/32 (2006.01)
B29K 75/00 (2006.01)
B29K 105/04 (2006.01)
B29L 31/00 (2006.01)

(52) U.S. Cl.
CPC ............... *C08K 7/22* (2013.01); *B29C 41/003* (2013.01); *B29C 41/22* (2013.01); *B29C 41/46* (2013.01); *C08J 9/32* (2013.01); *C08K 3/0008* (2013.01); *C08K 5/0008* (2013.01); *B29K 2075/00* (2013.01); *B29K 2105/043* (2013.01); *B29K 2995/0063* (2013.01); *B29L 2031/702* (2013.01); *B29L 2031/726* (2013.01); *C08J 2203/22* (2013.01); *C08J 2375/04* (2013.01); *C08L 2205/20* (2013.01)

(58) Field of Classification Search
CPC ................................. C08K 5/0008; C08K 7/22
USPC ................................. 523/210, 218; 264/45.1
See application file for complete search history.

(56) References Cited

U.S. PATENT DOCUMENTS

2009/0253322 A1* 10/2009 Xia ........................... B32B 7/12
442/59

FOREIGN PATENT DOCUMENTS

| JP | 2009-286969 A | 12/2009 |
| JP | 2013-018897 A | 1/2013 |
| KR | 10-0225600 B1 | 10/1999 |
| KR | 10-2000-0032833 A | 6/2000 |
| KR | 10-2010-0107328 A | 10/2010 |
| KR | 10-1192302 B1 | 10/2012 |
| KR | 10119302 | * 10/2012 |

* cited by examiner

*Primary Examiner* — Edward Cain
(74) *Attorney, Agent, or Firm* — McDermott Will & Emery LLP

(57) ABSTRACT

An ultra-light polyurethane artificial leather composition comprises a one-component type blocked polyurethane high solid resin of 100 parts per weight, a capsule-type hollow microsphere of 1 to 10 parts per weight, a curing agent of 1 to 10 parts per weight, and a high solid type toner of 1 to 20 parts per weight.

9 Claims, 2 Drawing Sheets

A : Existing capsule-type blowing agent
B : Capsule-type hollow microsphere of the present invention

ULTRA-LIGHT POLYURETHANE ARTIFICIAL LEATHER COMPOSITION

CROSS-REFERENCE TO RELATED APPLICATION

This application claims under 35 U.S.C. §119(a) the benefit of priority to Korean Patent Application No. 10-2014-0083855 filed on Jul. 4, 2014, the entire contents of which are incorporated herein by reference.

TECHNICAL FIELD

The present disclosure relates to an ultra-light polyurethane artificial leather composition. More particularly, it relates to an ultra-light polyurethane artificial leather composition, which can be manufactured as volatile organic compounds (VOC) emission is inhibited, has excellent tensile strength and softness, and can homogenously distribute an air layer and porous cells.

BACKGROUND

As an artificial leather material, organic solvent-type one-component type polyurethane and olefin-based artificial leather are used. Accordingly, a toxic volatile organic compounds (VOC) remained organic solvents (dimethylformamide, methylethylketone, and toluene) are harmful to a human body and work environment. In particular, if the VOC is applied to vehicles, VOC emission in a closed space becomes serious. There have been various studies to reduce the emission, however, a new solution is necessary for the interior quality standard of a completed car to provide a uniform size of a porous cell skin layer of the leather and prevent thermal deformation.

The above information disclosed in this Background section is only for enhancement of understanding of the background of the disclosure, and therefore, it may contain information that does not form the prior art that is already known in this country to a person of ordinary skill in the art.

SUMMARY OF THE DISCLOSURE

The present disclosure has been made in an effort to solve the above-described problems associated with prior art.

The present disclosure provides an ultra-light polyurethane artificial leather, which can solve problems of non-uniform porous cell formation and thermal deformation.

More specifically, the present disclosure provides an artificial leather, which minimizes volatile organic compounds (VOC) emission, has excellent various physical properties, such as tensile strength, elastic force, and softness, thereby useful for an interior material of home furniture or vehicle.

According to an exemplary embodiment of the present inventive concept, an ultra-light polyurethane artificial leather composition comprising: an one-component type blocked polyurethane high solid resin of 100 parts per weight; a capsule-type microsphere of 1 to 10 parts per weight; a curing agent of 1 to 10 parts per weight; and a high solid type toner of 1 to 20 parts per weight.

The one-component type blocked polyurethane high solid resin may comprise: at least one polyol of 60 to 80 wt % selected from the group consisting of polyetherpolyol having an OH value of 26 to 30 mgKOH/g, polyesterpolyol having an OH value of 51 to 57 mgKOH/g, and glycol; an isocyanate compound of 15 to 30 wt %; and a blocking agent of 5 to 10 wt %.

The polyetherpolyol may be at least one selected from the group consisting of polyetheyleneglycol (PEG), polycarbonatediol (PCD), polypropyleneglycol (PPG), and polytetramethyleneetherglycol (PTMEG). The polyesterpolyol is manufactured by reacting adipic acid and neopentylglycol, and the glycol is at least one selected from the group consisting of 1,6-hexanediol, ethyleneglycol, and diethyleneglycol.

The capsule-type microsphere may be a hollow microsphere made from an organic material having a softening temperature of 170° C. or higher. More specifically, the capsule-type microsphere may be a microsphere in which a shell made of a thermoplastic resin having the softening temperature of 170° C. to 220° C. is filled with hydrocarbon having a low boiling point of less than 170° C.

The hydrocarbon having a low boiling point may be liquefied hydrocarbon.

The capsule-type microsphere may have a diameter of 10 to 200 μm.

The curing agent may be used for curing the one-component type blocked polyurethane high solid resin.

The high solid type toner may be at least one selected from the group consisting of non-phthalates, esters, and ethers.

According to another exemplary embodiment of the present disclosure, a method for manufacturing a ultra-light polyurethane artificial leather comprising the steps of: a) coating an one-component type blocked polyurethane high solid resin on a release paper to a thickness of 0.1 to 0.2 mm to form a surface skin layer; b) coating a composition on the surface skin layer to a thickness of 0.3 to 0.5 mm, and then heat curing thereof at a temperature of 150 to 170° C. to form a porous foamed layer; c) coating an adhesive on the foamed layer to a thickness of 0.1 to 0.2 mm and then adhering a fabric thereon; d) aging at a temperature of 80 to 90° C. for 24 hours; and e) peeling off the release paper. The composition includes the one-component type blocked polyurethane high solid resin of 100 parts per weight, a capsule-type microsphere of 1 to 10 parts per weight, a curing agent of 1 to 10 parts per weight, and a high solid type toner of 1 to 20 parts per weight Other aspects and exemplary embodiments of the inventive concept are discussed infra.

BRIEF DESCRIPTION OF THE DRAWINGS

The above and other features of the present inventive concept will now be described in detail with reference to certain exemplary embodiments thereof illustrated the accompanying drawings which are given hereinbelow by way of illustration only, and thus are not limitative of the present disclosure.

Figure 1:
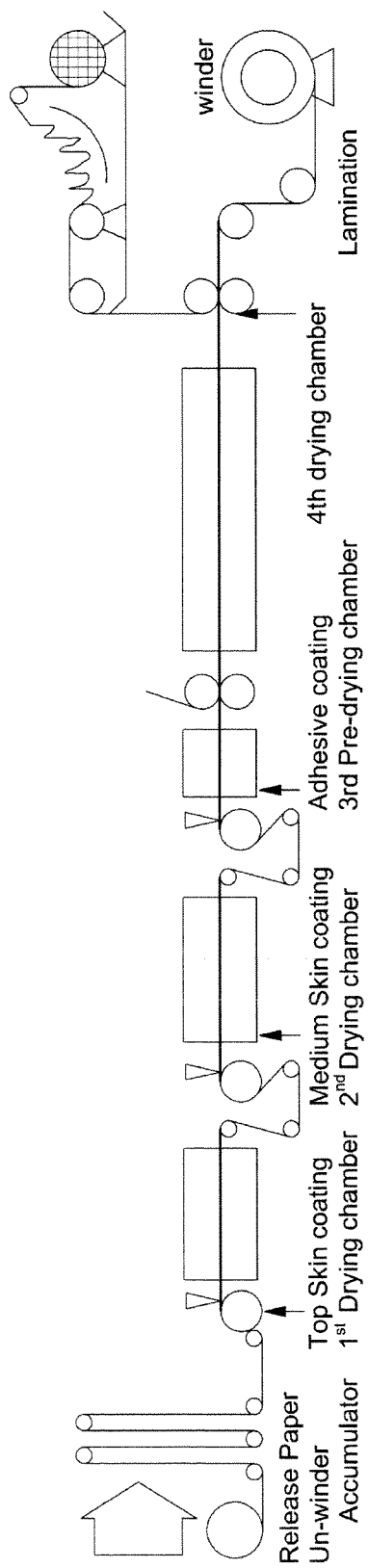
FIG. 1 is a schematic diagram illustrating a manufacturing process of artificial leather.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present inventive concept, examples of which are illustrated in the accompanying drawings and described below. While the disclosure will be described in conjunction with exemplary embodiments, it will be understood that present description is not intended to limit the invention to those exemplary embodiments. On the contrary, the inventive concept is intended to cover not only the exemplary embodiments, but also various alternatives, modifications, equivalents, and other embodiments, which may be included within the spirit and scope of the disclosure as defined by the appended claims.

The present disclosure relates to an ultra-light polyurethane artificial leather composition, which comprises a one-component type blocked polyurethane high solid resin, a capsule-type microsphere, a curing agent and a high solid type toner. Each ingredient constituting the ultra-light polyurethane artificial leather composition according to the present disclosure will be described in detail.

(1) One-Component Type Blocked Polyurethane High Solid Resin

In the present disclosure, as a polyurethane material, an one-component type blocked polyurethane high solid resin is used. The polyurethane resin used in the present disclosure is non-solvent type not containing organic solvents. Accordingly, it is an environmental-friendly material, free from volatile organic compounds (VOC) emission, and also has excellent elastic force and durability. The one-component type blocked polyurethane high solid resin may comprise polyol of 60 to 80 wt %, an isocyanate compound 15 to 30 wt % and a blocking agent 5 to 10 wt %.

The polyol constituting the one-component type blocked polyurethane high solid resin may be polyetherpolyol, polyesterpolyol, glycol, or a mixture thereof. The polyetherpolyol may have an average molecular weight of 400 to 6,000 and OH value of 26 to 30 mgKOH/g. If an average molecular weight and OH value of the polyetherpolyol are less than a reference range, reaction is progressed fast, thereby physical properties of the polyurethane may be deteriorated, and if OH value and weight average molecular weight are over the reference range, physical properties may be deteriorated during a polyurethane reaction due to high viscosity. Specifically, the polyetherpolyol may be at least one selected from polyetheyleneglycol (PEG), polycarbonatediol (PCD), polypropyleneglycol (PPG), polytetramethyleneetherglycol (PTMEG), and the like or polycarbonatediol (PCD).

The polyesterpolyol adjusts durability and hydrolysis property of polymer urethane in the polyurethane reaction. Accordingly, it determines elasticity and flexibility depending on its quantity, and acts on hydrolysis resistant property. Preferably, the polyesterpolyol may have an average molecular weight of 1,700 to 2,500 and an OH value of 51 to 57 mgKOH/g. If a weight average molecular weight and an OH value of the polyesterpolyol are less than the reference range, the reaction is progressed fast, thereby physical properties of the polyurethane may be deteriorated. If an OH value and a molecular weight are greater the reference range, physical properties may be deteriorated during the polyurethane reaction because its viscosity is too high. Specifically, the polyesterpolyol may be prepared by reacting adipic acid and neopentylglycol at molar ratio of 1:1.

The glycol acts on adjusting modulus and softness, and may be at least one selected from 1,6-hexane diol, ethyleneglycol, diethyleneglycol, and the like.

The polyol is contained in an amount of 60 to 80 wt % as an ingredient of the one-component type blocked polyurethane high solid resin. If its amount is less than 60 wt %, feel of the product may be hard and flexibility may be deteriorated, and if its amount is over 80 wt %, its physical and chemical properties will be deteriorated.

The isocyanate compound may be an aliphatic or aromatic isocyanate compound, which is commonly used for preparing polyurethane, but not limited thereto. Specifically, the aliphatic isocyanate compound may be at least one selected from the group consisting of hexamethylene diisocyanate, isoprene diisocyanate, dicyclohexylmethane diisocyanate, and the like. Specifically, the aromatic isocyanate compound may be at least one selected from the group consisting of diphenylmethane diisocyanate, naphthalene-1,5-diisocyanate, polyphenylenepolymethylene polyisocyanate, 2,4-tolylene diisocyanate, and 2,6-tolylene diisocyanate or at least one selected from the group consisting of diphenylmethane diisocyanate (MDI), hexamethylene diisocyanate (HDI), isoprene diisocyanate (IPDI), and dicyclohexylmethane diisocyanate (DCMDI).

As an ingredient of the one-component type blocked polyurethane high solid resin, the isocyanate compound may be contained in an amount of 15 to 30 wt %. If its amount is less than 15 wt %, it may be difficult to form a surface skin layer, and its amount is over 30 wt %, its viscosity may be increased, and the product will be hardened.

The blocking agent is to block a terminal NCO group of the isocyanate compound. Specifically, this blocking agent may be at least one selected from the group consisting of caprolactam, 3,5-dimethylpyrazole, 1,2,4-triazole, imidazole, 2-butynindiethylmalonate, ethylacetoacetate, and methylethylketoxim.

As an ingredient of the one-component type blocked polyurethane high solid resin, the blocking agent may be used in an amount of 5 to 10 wt %. If its amount is less than 5 wt %, there is a concern that the NCO group of the isocyanate compound is not blocked enough, and if its amount is over 10 wt %, curing of the excess urethane may slow down and its physical property may be deteriorated.

(2) Capsule-Type Microsphere

The capsule-type microsphere used in the present disclosure is a microsphere in which a shell made of a thermal thermoplastic material having a Heat Deflection Temperature, i.e., the softening temperature of 170° C. or higher is filled with hydrocarbon having the low boiling point, and it is used in the state that the hydrocarbon is completely expanded to a maximum value.

The existing microcapsule-type blowing agent has characteristics that the capsule made of a thermoplastic resin is softened when heating the capsule in the state that the hydrocarbon having low boiling point is filled in the capsule of the thermoplastic resin, and internal pressure is increased by expansion of the internal hydrocarbon, thereby it is expanded to 50 to 70 times of the initial volume. The existing microcapsule-type blowing agent is thermally expanded, and consequently forms an air layer and a porous cell layer in the artificial leather. However, because a processing temperature of a product is determined depending on the softening temperature of the capsule (140 to 160° C.), it was very difficult to maintain the uniform softening temperature of the capsule in a continuous processing process.

Namely, there was serious problems that the existing microcapsule-type blowing agent is difficult to form porous cells having uniform size, and non-expanded blowing agent remained in the final product is expanded or shrunk by continuous heat, thereby causing product deformation.

On the contrary, the capsule-type microsphere used in the present invention selected a shell material having higher softening temperature (170 to 220° C.) than the product processing temperature (130 to 170° C.), it was possible to form porous cells having a uniform size and to obtain an excellent thermal deformation resistance product, which does not have product deformation by heat because the hollow microsphere is added to the one-component type blocked polyurethane high solid resin in the state that the hollow microsphere is expanded to the maximum.

The capsule-type microsphere used in the present disclosure may have a diameter of 10 to 200 μm or 20 to 100 μm. It has an excellent characteristic that the capsule is not broken due to its elasticity even if it is stirred at a high speed of 500 to 1000 rpm.

The shell of the capsule-type microsphere is made from a thermoplastic resin having a softening temperature of 170° C. or higher or 190 to 220° C. A monomer, which is suitable for synthesizing the shell, may be, for example, a nitrile-based monomer such as acrylonitrile, methacrylonitrile, α-chloroacrylonitrile, α-ethoxyacrylonitrile, and fumaronitrile; a carboxyl group-containing monomer, such as acrylic acid, methacrylic acid, itaconic acid, maleic acid, fumaric acid and citraconic acid; a halogenated vinyl-based monomer such as vinyl chloride, vinylidene chloride, vinyl bromide, and vinyl fluoride; a vinyl ester-based monomer such as vinyl acetate, vinyl propionate and vinyl butyrate; a (meth)acrylic acid ester-based monomer, such as methyl (meth)acrylate, ethyl(meth)acrylate, n-butyl(meth)acrylate, isobutyl(meth)acrylate, t-butyl(meth)acrylate, propyl(meth) acrylate, n-octyl(meth)acrylate, dodecyl(meth)acrylate, 2-ethylhexyl(meth)acrylate, stearyl(meth)acrylate, 2-chloroethyl(meth)acrylate, phenyl(meth)acrylate, isobonyl(meth) acrylate, cyclohexyl(meth)acrylate, benzyl(meth)acrylate, β-carboxyethylacrylate, 2-hydroxyethyl(meth)acrylate, and 2-hydroxypropyl(meth)acrylate; a styrene-based monomer, such as styrene, α-methylstyrene, and chlorostyrene; an acrylamide-based monomer, such as acrylamide, substituted acrylamide, methacrylamide and substituted methacrylamide; a maleimide-based monomer such as N-phenylmaleimide, N-(2-chlorophenyl)maleimide, N-cyclohexylmaleimide, and N-laurylmaleimide; a styrene-based monomer, such as styrene, o-methylstyrene, m-methylstyrene, p-methylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, n-methoxystyrene, p-phenylstyrene, p-chlorostyrene, and 3,4-dichlorostyrene; an ethylene unsaturated mono-olefin-based monomer, such as ethylene, propylene, butylene and isobutylene; a vinylether-based monomer such as vinylmethylether, vinylethylether, and vinylisobutylether; a vinylketone-based monomer, such as vinylmethylketone, vinylhexylketone, and methylisopropenyllketone; a N-vinyl-based monomer, such as N-vinylpyrrole, N-vinylcarbazole, N-vinylindole, and N-vinylpyrrolidone; and vinylnaphthalin salt. In the above, the '(meth)acryl' means acryl or methacryl.

Further, when synthesizing the shell, as a cross-linking agent, a polyunsaturated compound comprising allyl methacrylate, ethylene glycol dimethacrylate, diethylene glycol dimethacrylate, triethylene glycol dimethacrylate, polyethylene glycol dimethacrylate, trimethyloipropane trimethacrylate, pentaerithrityl tetramethacrylate, bis(metacryloyloxymethyl)tricyclodecane and corresponding diacrylate, divinylbenzene, and the like may be used. The cross-linking agent may be generally used in an amount of 0.1 to 2 wt %, based on all comonomers. The shell may be made up of a polymer or copolymer consisting of vinylidene chloride, acrylonitrile, (meth)acrylate monomer, or a mixture thereof. More particularly, it may be a copolymer of polyvinylidene chloride and polyacrylonitrile.

In the shell of the capsule-type microsphere used in the present invention, hydrocarbon having low boiling point is filled. The hydrocarbon having low boiling point may be a material having the boiling point, which is lower than the softening temperature of the thermoplastic resin constituting the shell, and specifically, it may be any material having the boiling point of less than 170° C. For example, the hydrocarbon having a low boiling point may be hydrocarbon having a carbon number of 1 to 12 or its halide, fluoride-containing ether compound having carbon number of 2 to 10, and tetraalkyl silane. In addition, a compound generating gas by pyrolizing, for example, azodicarbonamide, N,N'-dinitrosopentamethylenetetramine, and 4,4'-oxybis(benzenesulfonyl hydrazide) may be used. The hydrocarbon having low boiling point may be liquid having a boiling point of less than 60° C. More particularly, the hydrocarbon having a low boiling point may be liquefied hydrocarbon.

The method of manufacturing the capsule-type microsphere is a common method, and it may be, for example, interfacial polymerization, reverse emulsification, emulsion polymerization, and the like. Further, it may be solvent evaporation, coacervation, spray-drying, dry mixing, and the like.

Further, the capsule-type microsphere is commercially available, and therefore, it may be purchased from Dongjin semichem Co., Ltd., Kumyang Co., Ltd., 3M and Matumoto Co., Ltd.

The capsule-type microsphere may be used in an amount of 1 to 10 parts per weight or 2 to 5 parts per weight, based on 100 parts per weight of the one-component type blocked polyurethane high solid resin. If the amount of the capsule-type microsphere is less than 1 parts per weight, it may be insufficient to be used as an interior artificial leather due to its hard feeling caused by heavy specific gravity of the artificial leather and no massing, and if its amount is over 10 parts per weight, there may be a problem of decrease of physical properties such as contractile force, adhesive force, flexibility, and tensile strength by formation of excess air layer.

(3) Curing Agent

In the present disclosure, the curing agent is added to cure the one-component type blocked polyurethane high solid resin. The curing agent, which can be used in the present invention, may be a common polyurethane curing agent, for example, at least one selected from isophorone diamine, ethylene diamine, propylene diamine, and 4,4-diamino-dicyclohexylmethane.

The curing agent may be added in an amount of 1 to 10 parts per weight, based on 100 parts per weight of the one-component type blocked polyurethane high solid resin. If the amount of the curing agent is less than 1 parts per weight, there may be a concern that the polyurethane high solid resin may not be cured enough due to shortage of the curing agent. If its amount of the curing agent is over 10 parts per weight, there may be a concern that physical properties may be deteriorated by excessively added curing agent.

(4) High Solid Type Toner

In the present disclosure, the high solid type toner is used to embody various color. The high solid type toner used in the present disclosure may be non-volatile toner, which does not use any solvent. Specifically, the high solid type toner may be at least one selected from the group consisting of non-phthalates, esters, and ethers. The high solid type toner may be added in an amount of 1 to 20 parts per weight or 2 to 10 parts per weight, based on 100 parts per weight of the one-component type blocked polyurethane high solid resin. If the amount of the high solid type toner is less than 1 part per weight, there may be a concern of reduced hiding power, and if its amount is over 20 parts per weight, there may be a problem of reduction of physical properties such as adhesive force, flexibility, tensile strength, and hydrolysis resistance.

Artificial leather can be manufactured by using the ingredients described above. Accordingly, the method for manufacturing the artificial leather may be a common method, and there is no particular limitation to the method for manufacturing the artificial leather.

FIG. 1 illustrates a schematic diagram of a general manufacturing method of artificial leather. According to FIG. 1, the artificial leather can be manufactured by forming a non-foaming surface skin layer (thickness: 0.1 to 0.2 mm) on a release paper using the one-component type blocked polyurethane high solid resin; coating a composition comprising the one-component type blocked polyurethane high solid resin, the capsule-type microsphere, a curing agent and a high solid type toner on the surface skin layer to form a porous foamed layer (thickness: 0.3 to 0.5 mm); and coating an adhesive on the foamed layer (thickness: 0.1 to 0.2 mm) and then adhering a fabric thereon.

Further, the method for manufacturing the ultra-light polyurethane artificial leather according to the present disclosure is as follows.

Figure 2:
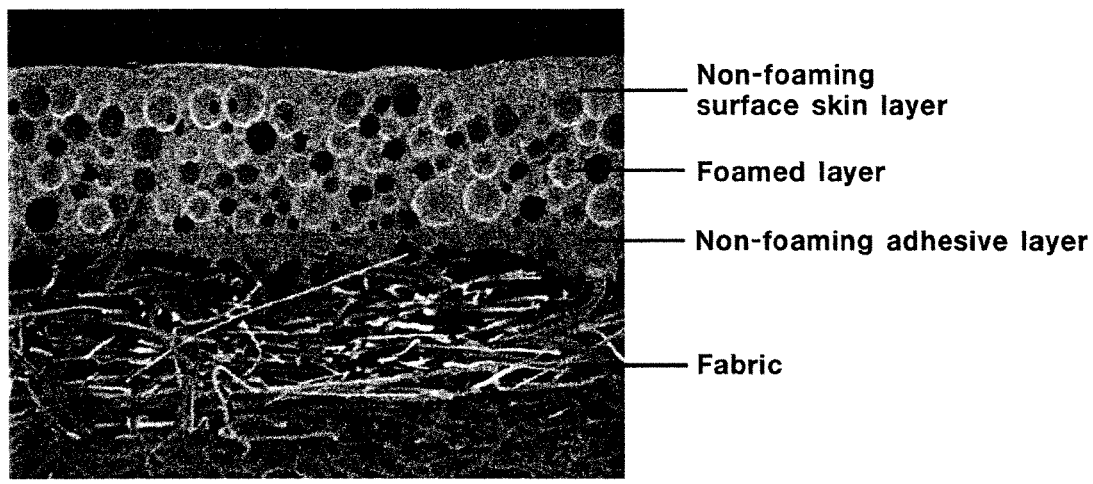
FIG. 2 is a cross-sectional diagram of an artificial leather.

The method for manufacturing the artificial leather according to the present disclosure comprises steps of: a) coating the one-component type blocked polyurethane high solid resin on the release paper to the thickness of 0.1 to 0.2 mm to form a surface skin layer; b) coating the artificial leather composition according to the present disclosure, i.e., a composition, comprising the one-component type blocked polyurethane high solid resin, the capsule-type microsphere, the curing agent and the high solid type toner on the surface skin layer to a thickness of 0.3 to 0.5 mm, and then heat curing thereof at a temperature of 150 to 170° C. to form a porous foamed layer; c) coating an adhesive on the porous foamed layer to a thickness of 0.1 to 0.2 mm, and then adhering a fabric thereon; d) aging thereof at a temperature of 80 to 90° C. for 24 hours; and e) peeling off the release paper. A cross-sectional diagram of the artificial leather manufactured by the method described above is shown in FIG. 2.

In the above artificial leather manufacturing method, the adhesive, which is used for adhering the fabric on the foamed layer may be a common polyurethane adhesive or the one-component type blocked polyurethane high solid resin, but not limited thereto.

EXAMPLES

The following examples illustrate the invention and are not intended to limit the same.

Preparation Example

Preparation of One-Component Type Polyurethane High Solid Resin

Polycarbonatediol (PCD) with 45 wt % and polytetramethyleneetherglycol (PTMEG) 32 with wt % as a polyol ingredient, isophorone diisocyanate with 15 wt % as an isocyanate compound, methylethylketoxime with 7 wt % as a blocking agent, and a surface conditioner with 1 wt % as other additive were used to prepare an one-component type blocked polyurethane high solid resin.

Example 1

Property Change of Artificial Leather Depending on Amount of Capsule-Type Microsphere Capsule-type microsphere (Matumoto, 100MCA), 4,4'-diaminodicyclohexylmethane as a curing agent and high solid type toner (Dongah chem., DF-100) were mixed and stirred with the one-component type blocked polyurethane high solid resin prepared in Preparation Example at a content ratio shown in the following Table 1 to manufacture a composition for an artificial leather.

The one-component type blocked polyurethane high solid resin prepared in Preparation Example was coated on a release paper to a thickness of 0.2 mm to form a surface skin layer. The composition for artificial leather was coated on the surface skin layer to a thickness of 0.4 mm, and then heat cured at a temperature of 150 to 170° C. to form a porous foamed layer wherein an air layer and a porous cell were mixed. The one-component type blocked polyurethane high solid resin prepared in Preparation Example as an adhesive was coated on the foamed layer to a thickness of 0.1 mm, and then a non-woven fabric was adhered thereon followed by aging at a temperature of 80 to 90° C. for 24 hours. The release paper was peeled off to manufacture an artificial leather sample.

In the following Table 1, the results of measuring property change of the artificial leather depending on the amount of the capsule-type microsphere contained in the composition for artificial leather.

TABLE 1

| | Classification | Example 1-1 | Example 1-2 | Example 1-3 | Example 1-4 |
|---|---|---|---|---|---|
| Artificial leather composition (Part per weight) | Polyurethane high solid resin | 100 | 100 | 100 | 100 |
| | Capsule-type hollow microsphere* | 0 | 5 | 10 | 20 |
| | Curing agent | 5 | 5 | 5 | 5 |
| | High solid-type toner | 5 | 5 | 5 | 5 |
| Property of Artificial leather | Tensile strength (kgf/cm$^2$) | 40 to 50 | 30 to 40 | 30 to 40 | 20 to 30 |
| | Specific gravity | 1.5 | 1.3 | 1.1 | 0.7 |

*Capsule-type hollow microsphere: Matumoto Co., Ltd., 100MCA, diameter 60 μm, specific gravity 0.12

According to results of Table 1, it can be found that final properties of the artificial leather are changed depending on the amount of the capsule-type microsphere.

Example 1-1 is a sample wherein the capsule-type microsphere is not added, and its tensile strength was excellent but specific gravity was high. Accordingly, an ultra-light artificial leather could not be provided. Examples 1-2 and 1-3 are samples where the capsule-type microsphere was added in an amount of 5 parts per weight or 10 parts per weight, and their tensile strength was excellent and also specific gravity was significantly reduced. Example 1-4 is a sample where the capsule-type microsphere was added in an amount of 20 parts per weight, and its specific gravity was very low, but tensile strength was significantly reduced. Accordingly, it did not satisfy the properties required for artificial leather.

Example 2

Property and Specific Gravity Change of Artificial Leather Depending on Size and Specific Gravity of Hollow Microsphere The procedure of Example 1 was repeated except for mixing and stirring at the content ratio shown in Table 2 to manufacture a composition for artificial leather and an artificial leather sample.

In the following Table 2, results of measuring property and specific gravity change of the artificial leather depending on the size and specific gravity of the capsule-type microsphere contained in the composition for artificial leather.

TABLE 2

| Classification | | | Example 2-1 | Example 2-2 | Example 2-3 | Example 2-3 |
|---|---|---|---|---|---|---|
| Artificial leather composition (Part per weight) | Polyurethane high solid resin | | 100 | 100 | 100 | 100 |
| | Capsule-type hollow microsphere | 81GTA | 10 | — | — | — |
| | | SEVEN | — | 10 | — | — |
| | | HD60CA | — | — | 10 | — |
| | | 100MCA | — | — | — | 10 |
| | Curing agent | | 5 | 5 | 5 | 5 |
| | High solid-type toner | | 5 | 5 | 5 | 5 |
| Property of Artificial leather | Tensile strength (kgf/cm²) | | 40 to 50 | 30 to 45 | 30 to 40 | 30 to 40 |
| | Specific gravity | | 1.4 | 1.25 | 1.11 | 1.1 |

[capsule-type hollow microsphere: Matumoto Co., Ltd.]
81GTA: Diameter 10 μm, Specific gravity 0.23
SEVEN: Diameter 20 μm, Specific gravity 0.20
HD60CA: Diameter 50 μm, Specific gravity 0.12
100MCA: Diameter 60 μm, Specific gravity 0.12

According to the results of Table 2, it can be found that final property and specific gravity of the artificial leather were changed by the diameter and specific gravity of the capsule-type microsphere. It can be found that generally, as the size of the capsule-type microsphere becomes smaller, the tensile strength and specific gravity of the artificial are increased. Namely, the ratio distributed in the same thickness becomes lower as the diameter of the capsule-type microsphere is reduced. Accordingly, it can be found that the size does not reduce the property and specific gravity of the high solid resin (The result of comparing tensile strength of 1-1 and 2-1 in Table 1). However, there was no property deterioration according to the size of the microsphere at a certain size or more (2-1, 2-2 and 2-3 in Table 2). On the contrary, it can be found that the specific gravity of the artificial leather was significantly reduced (light weighted). Namely, after considering the results of Table 2, it can be found that the size of the hollow microsphere works as a factor for determining the specific gravity (light weight) of the final artificial leather rather than property change.

Examples 3 to 5 and Comparative Example 1:

Property Change of Artificial Leather Depending on Amount of Capsule-Type Microsphere The procedure of Example 1 was repeated except for mixing and stirring at a content ratio shown in Table 3 to manufacture a composition for artificial leather and an artificial leather sample.

In the following Table 3, property, specific gravity and feeling of the artificial leather samples manufactured in Examples 3 to 5 and Comparative Example 1 are compared.

TABLE 3

| Classification | | Example 3 | Example 4 | Example 5 | Comparative Example 1 |
|---|---|---|---|---|---|
| Artificial leather composition (Part per weight) | Polyurethane high solid resin | 100 | 100 | 100 | 100 |
| | Capsule-type hollow microsphere* | 5 | 10 | 20 | — |
| | Curing agent | 5 | 5 | 5 | 5 |
| | High solid-type toner | 5 | 5 | 5 | 5 |

TABLE 3-continued

| Classification | | Example 3 | Example 4 | Example 5 | Comparative Example 1 |
|---|---|---|---|---|---|
| Property of Artificial leather | Inner cell structure[1] | Cell formed | Cell formed | Cell formed | No cell |
| | Tensile strength (kgf/cm²) [2] | 30 to 40 | 30 to 40 | 30 to 40 | 40 to 50 |
| | Adhesive force[3] (kgf/cm²) | 5 to 10 | 5 to 10 | 5 to 10 | 5 to 10 |
| | Specific gravity | 1.3 | 1.1 | 0.7 | 1.5 |
| | Feeling | Soft | Soft | Very soft | Hard |

*capsule-type hollow microsphere: Matumoto Co., Ltd., Product name 100MCA, Diameter 60 μm, Specific gravity 0.12
[1] Observed by electron microscope.
[2] and [3] are measured according to JIS K 6301(3)

As shown in Table 3, it can be found that in the artificial leather samples of Examples 3 to 5, the feeling was soft, the specific gravity was reduced, and the tensile strength and adhesive force were maintained at excellent level because an air layer and porous cell were formed therein. On the contrary, in the artificial leather sample of Comparative Example 1, the tensile strength and adhesive force were excellent, but the feeling was hard and the specific gravity was high. Accordingly, there is a limit to be used as an interior material.

Comparative Examples 2 to 5 and Example 6

Comparing Property of Artificial Leather by Using Existing Blowing Agent

Properties of the artificial leather by using a capsule-type blowing agent commonly used in the art other than the capsule-type microsphere used as a blowing agent in the present disclosure were compared.

Namely, the procedure of Example 1 was repeated except for mixing and stirring at a content ratio shown in Table 4 to manufacture a composition for artificial leather and an artificial leather sample, and the artificial leather was processed by forming bubbles according to the existing method. Namely, the artificial leather was processed by forming bubbles according to the method expanding the existing blowing agent at 150° C. or higher (high temperature) or the method mixing Freon gas.

However, in the case of using the capsule-type microsphere as in Comparative Examples 5 and Example 6, it can be found that properties such as specific gravity, adhesive force, tensile strength and feeling of the manufactured artificial leather are almost same even if the processing temperature is different as 150° C. or 180° C. Namely, it can be found that when using the capsule-type microsphere according to the present disclosure, an artificial leather product having uniform properties and specific gravity can be manufactured even if the processing condition of the continuous processing process is somewhat irregular.

Further, if the product is completed in Comparative Example 3 using the existing capsule-type blowing agent, and later a customer heats the product environmentally, physically and chemically, there may be very important defects that the completed product may be swollen, and the product size is shrunk and changed by expansion and shrinkage because latent shell of the capsule-type blowing agent reach to the softening temperature again.

Test Example

Test Example 1

Comparing Heat Resistance of the Existing Capsule-Type Blowing Agent and the Inventive Capsule-Type Microsphere This experiment confirms heat resistance of the existing capsule-type blowing agent and the capsule-type micro-

TABLE 4

| Classification | | Comparative Example 2 | Comparative Example 3 | Comparative Example 4 | Comparative Example 5 | Example 6 |
|---|---|---|---|---|---|---|
| Artificial leather composition (Part per weight) | Polyurethane high solid resin | 100 | 100 | 100 | 100 | 100 |
| | Blowing agent* | 0 | 10 | 10 | 10 | 10 |
| | Curing agent | 5 | 5 | 5 | 5 | 5 |
| | High solid-type toner | 5 | 5 | 5 | 5 | 5 |
| Property of Artificial leather | Inner cell structure[1] | No cell | Cell formed | Cell formed | Cell formed | Cell formed |
| | Tensile strength $(kgf/cm^2)$[2] | 40 to 50 | 30 to 45 | 30 to 40 | 30 to 40 | 30 to 40 |
| | Adhesive force[3] $(kgf/cm^2)$ | 5 to 10 | 5 to 10 | 5 to 10 | 5 to 10 | 5 to 10 |
| | Specific gravity | 1.5 | 1.2 | 0.9 | 0.9 | 0.9 |
| | Feeling | Hard | Soft | Very soft | Very soft | Very soft |

*Blowing agent (Porous cell): Comparative Example 2: Not use. Cured at 150° C. for 3 min Comparative Example 3: Capsule-type blowing agent (Akzonobel, Expancel DU-40, Expansion temperature start 110° C. max 165° C.); Processed at 150° C. for 3 min after adding blowing agent. Comparative Example 4: Capsule-type blowing agent (Akzonobel Expancel DU-40, Expansion temperature start 110° C. max 165° C.); Processed at 160° C. for 3 min after adding blowing agent. Comparative Example 5: Capsule-type hollow microsphere (Matumoto, Product name F-190D, Diameter 50 μm, Specific gravity 0.12, Heat resistant temperature 180° C.); Processed at 150° C. for 3 min after adding hollow microsphere. Example 6: capsule-type hollow microsphere (Matumoto, Product name F-190D, Diameter 50 μm, Specific gravity 0.12, Heat resistant temperature 180° C.); Processed at 180° C. for 3 min after adding hollow microsphere.
[1]Observed by electron microscope.
[2]and [3]are measured according to JIS K 6301(3)

According to the results of Table 4, Comparative Examples 3 and 4 are artificial leather samples wherein the existing capsule-type blowing agent was added thereto. It can be found that the specific gravity are different depending on a processing condition (particularly, processing temperature) but the blowing agent was added in the same amount. Namely, if the existing capsule-type blowing agent was used, it can be found that it is difficult to manufacture products having the same quality in a continuous processing.

sphere. The existing capsule-type blowing agent and the capsule-type microsphere used as a blowing agent in the present disclosure are prepared 30 g, respectively, and change of the blowing agent depending on time while heating at 150° C. was observed. Results are shown in FIG. 3.

Figure 3:
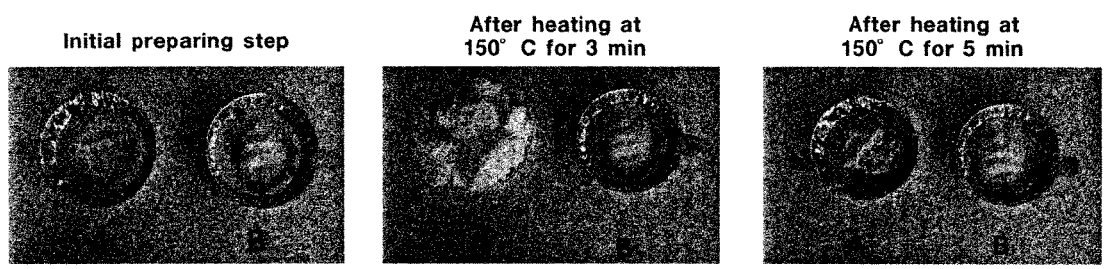
FIG. 3 is pictures comparing heat resistance of the existing thermally expandable microcapsule-type blowing agent and a capsule-type microsphere used as a blowing agent in the present disclosure.

According to FIG. 3, when heating at 150° C. for 3 min, the existing capsule-type blowing agent (A) was foamed (expanded) to the maximum, but the volume of the capsule-type microsphere (B) was not changed. When heating at 150° C. for 5 min, the existing capsule-type blowing agent (A) was shrunk because the shell was thermally melted and then internal gas was emitted, but the volume of the capsule-type microsphere (B) was not changed.

According to the above results, it can be found that the capsule-type microsphere (B) secured enough heat resistance to the heat resistant temperature of 170° C. or higher, and was very stable to thermal deformation, compared to the existing capsule-type blowing agent (A).

Density of the resin itself is reduced by adding the capsule-type microsphere to the one-component type blocked polyurethane high solid resin, and the capsule-type microsphere was uniformly dispersed in the one-component type blocked polyurethane high solid resin, thereby forming a porous cell structure. Accordingly, an effect of reducing massing and density could be obtained by improving high hood against the same coated resin amount.

The present disclosure has an effect of basically blocking the emission of volatile organic compounds (VOC) by using the one-component type blocked polyurethane high solid resin not containing organic solvent.

Further, an effect of increasing workability by preventing high viscosity increased through controlling the amount of the capsule-type microsphere.

Further, the artificial leather manufactured by curing the composition according to the present disclosure may have an effect of heat insulation, sound insulation and dust protection by the uniform air layer formed inside. Further, ultra-light may be obtained by the porous cell structure formed therein, and its elasticity and softness can stand comparison with natural leather, and but rather more excellent.

Thus, the artificial leather manufactured according to the present disclosure is useful as an interior material for home furniture and vehicle.

The disclosure has been described in detail with reference to exemplary embodiments thereof. However, it will be appreciated by those skilled in the art that changes may be made in these embodiments without departing from the principles and spirit of the disclosure, the scope of which is defined in the appended claims and their equivalents.

What is claimed is:

1. An ultra-light polyurethane artificial leather composition comprising:
    a one-component type blocked polyurethane high solid resin of 100 parts per weight;
    a capsule-type microsphere of 1 to 10 parts per weight;
    a curing agent of 1 to 10 parts per weight; and
    a high solid type toner of 1 to 20 parts per weight,
    wherein the capsule-type microsphere has a shell which is made of a thermoplastic resin having a softening temperature of 170° C. to 220° C., and inside of the shell is filled with hydrocarbon having a low boiling point of less than 170° C.

2. The ultra-light polyurethane artificial leather composition of claim 1, wherein the one-component type blocked polyurethane high solid resin comprises:
    at least one polyol of 60 to 80 wt % selected from the group consisting of polyetherpolyol having an OH value of 26 to 30 mgKOH/g, polyesterpolyol having an OH value of 51 to 57 mgKOH/g, and glycol;
    an isocyanate compound of 15 to 30 wt %; and
    a blocking agent of 5 to 10 wt %.

3. The ultra-light polyurethane artificial leather composition of claim 2, wherein the polyetherpolyol is at least one selected from the group consisting of polyetheyleneglycol (PEG), polycarbonatediol (PCD), polypropyleneglycol (PPG), and polytetramethyleneetherglycol (PTMEG),
    the polyesterpolyol is manufactured by reacting adipic acid and neopentylglycol, and
    the glycol is at least one selected from the group consisting of 1,6-hexanediol, ethyleneglycol, and diethyleneglycol.

4. The ultra-light polyurethane artificial leather composition of claim 1, wherein the hydrocarbon having the low boiling point is liquefied hydrocarbon.

5. The ultra-light polyurethane artificial leather composition of claim 1, wherein the capsule-type microsphere has a diameter of 10 to 200 μm.

6. The ultra-light polyurethane artificial leather composition of claim 1, wherein the curing agent cures the one-component type blocked polyurethane high solid resin.

7. The ultra-light polyurethane artificial leather composition of claim 1, wherein the high solid type toner is at least one selected from the group consisting of non-phthalates, esters, and ethers.

8. An ultra-light artificial leather, which is manufactured by curing any one composition of claim 1 and used as an interior material for furniture or a vehicle.

9. A method for manufacturing an ultra-light polyurethane artificial leather, the method comprising steps of:
    a) coating an one-component type blocked polyurethane high solid resin on a release paper to a thickness of 0.1 to 0.2 mm to form a surface skin layer;
    b) coating a composition on the surface skin layer to a thickness of 0.3 to 0.5 mm, and then heat curing thereof at a temperature of 150 to 170° C. to form a porous foamed layer;
    c) coating an adhesive on the foamed layer to a thickness of 0.1 to 0.2 mm and then adhering a fabric thereon;
    d) aging at a temperature of 80 to 90° C. for 24 hours; and
    e) peeling off the release paper,
    wherein the composition includes the one-component type blocked polyurethane high solid resin of 100 parts per weight, a capsule-type microsphere of 1 to 10 parts per weight, a curing agent of 1 to 10 parts per weight, and a high solid type toner of 1 to 20 parts per weight,
    wherein the capsule-type microsphere has a shell which is made of a thermoplastic resin having a softening temperature of 170° C. to 220° C., and inside of the shell is filled with hydrocarbon having a low boiling point of less than 170° C.

* * * * *